(12) United States Patent
Hattori

(10) Patent No.: US 6,704,191 B2
(45) Date of Patent: Mar. 9, 2004

(54) MULTILAYER CERAMIC ELECTRONIC COMPONENTS AND METHODS FOR MANUFACTURING THE SAME

(75) Inventor: Koji Hattori, Shiga-ken (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 0 days.

(21) Appl. No.: 10/226,955

(22) Filed: Aug. 23, 2002

(65) Prior Publication Data
US 2003/0041427 A1 Mar. 6, 2003

(30) Foreign Application Priority Data
Aug. 23, 2001 (JP) .......................... 2001-252687

(51) Int. Cl.$^7$ ................ H01G 4/06; C03B 29/00
(52) U.S. Cl. ................ 361/321.3; 361/321.4; 156/89.12
(58) Field of Search ............ 361/311–313, 320, 361/321.1, 321.2, 321.3, 321.4, 321.5; 156/89.12, 89.16–89.21, 89.23; 264/614–620, 656, 657

(56) References Cited

U.S. PATENT DOCUMENTS 5,277,723 A * 1/1994 Kodama et al. .......... 156/89.15
5,405,466 A * 4/1995 Naito et al. ............... 156/89.17
6,254,715 B1 * 7/2001 Okazaki et al. ........... 156/280

* cited by examiner

Primary Examiner—Dean A. Reichard
Assistant Examiner—Eric Thomas
(74) Attorney, Agent, or Firm—Dickstein, Shapiro, Morin & Oshinsky, LLP.

(57) ABSTRACT

A green laminated body is subjected to heat treatment in a pressurized atmosphere at a gauge pressure exceeding 0.1 MPa to thereby remove binder. The resulting green laminated body is fired and thereby yields an laminated body including internal electrodes made of a metal film.

18 Claims, 1 Drawing Sheet

MULTILAYER CERAMIC ELECTRONIC COMPONENTS AND METHODS FOR MANUFACTURING THE SAME

BACKGROUND OF THE INVENTION

1. Field of the Invention

The present invention relates to methods for manufacturing multilayer ceramic capacitors and other multilayer ceramic electronic components and to multilayer ceramic electronic components manufactured by these methods. More specifically, it relates to improvements for increasing the numbers of layers of ceramic layers and internal electrodes and for thinning these layers.

2. Description of the Related Art

Typical examples of multilayer ceramic electronic components in which the present invention is interested are multilayer ceramic capacitors.

With increasing demands on downsizing, increasing electrostatic capacity and reducing cost in multilayer ceramic capacitors, constitutive ceramic layers composed of a dielectric material have been thinned to a thickness of about 3 $\mu$m. In addition, Cu, Ni and other base metals are used as conductive materials for internal conductor films, i.e., internal electrodes. Recently, multilayer ceramic capacitors each comprising further thinned ceramic layers about 1 $\mu$m thick have been developed.

To increase the electrostatic capacity, the number of layers of internal electrodes for yielding electrostatic capacity has been increased. In an laminated body comprising ceramic layers laminated with the interposition of internal electrodes, portions carrying the internal electrodes have a thickness larger than that of portions carrying no internal electrodes. When the number of layers of the internal electrodes is increased as mentioned above, the portions carrying the internal electrodes have a thickness markedly larger than that of portions carrying no internal electrodes to thereby cause distortion of the resulting laminated body. To avoid this problem, individual internal electrodes must be further thinned.

Such internal electrodes are conventionally formed by subjecting a conductive paste comprising a dispersed metal powder to screen printing to thereby form a pattern of the conductive paste on ceramic green sheets to be the ceramic layers. If thin internal electrodes are formed by screen printing in this manner, electrode breaks frequently occur during co-firing with the ceramic, and the electrostatic capacity of the resulting multilayer ceramic capacitor is less than the designed level. The thickness of the internal electrodes cannot therefore sufficiently be reduced as long as they are formed by screen printing using a conductive paste.

Conductive pastes for use in screen printing are mixtures of a metal powder, a resin (a binder) and a solvent. Accordingly, the physical thickness of the screen-printed internal electrodes is about two to three times as large as that of the constitutive metal component. This also prevents mitigation of the distortion of the laminated body induced by the thickness of the internal electrodes.

As a possible solution to these problems, a metal film formed by a thin film forming method is used as the internal electrodes. When the metal film is used as the internal electrodes, its physical thickness becomes nearly equal to that of the metal powder, and the distortion of the laminated body induced by thickness of the internal electrodes can significantly be mitigated. In the aforementioned internal electrodes formed by screen printing using a conductive paste, the metal powder in the conductive paste may not be dispersed satisfactorily in the resulting internal electrode. In contrast, the internal electrodes comprising the metal film formed by the thin film forming method are free of this problem. Accordingly, this technique is effective to thin the internal electrodes also from this point of view.

The metal film formed by the thin film forming method is nearly free of pinholes and other defects even when its thickness is, for example, less than or equal to 1 $\mu$m.

When a green laminated body comprising a plurality of ceramic green sheets and metal film laminated in alternate order is subjected to removal of a binder contained in the ceramic green sheet, i.e., to debinder (binder burnout), a gas is formed as a result of decomposition of the binder. The metal film is free of pinholes as described above and therefore prevents diffusion of the gas specifically in the lamination direction, thus preventing a sufficient debinder effect. In addition, the resulting multilayer ceramic capacitor tends to invite structural defects such as delamination at the interface between the metal film or the resulting internal electrodes and the ceramic green sheet or the resulting ceramic layers.

A possible solution to these problems is to reduce the amount of the binder (resin) in the ceramic green sheet. However, if the amount of the binder is reduced, the metal film internal electrode does not come into intimate contact with the ceramic green sheet properly when the metal film is brought into contact with the ceramic green sheet. Therefore, the amount of the binder in the ceramic green sheet must be increased in this technique as compared with the process in which the internal electrodes are prepared by screen printing using a conductive paste.

If the ceramic green sheet comprises an increased amount of the binder, the amount of the gas which is formed during the debinder process step as a result of decomposition of the binder increases. The gas formed in an increased amount should be diffused, but the metal film internal electrode prevents diffusion of the gas as described above, and the increased gas further frequently invites structural defects such as delamination at the interfaces between the internal electrodes and the ceramic layers.

In the debinder process step, the gas formed as a result of decomposition of the binder is generally emitted from pores formed as a result of burning of the binder in the ceramic green sheet, and the green laminated body itself shrinks during this process. Adhesion between the internal electrodes and the ceramic layers at the interfaces decreases as the decomposition of the binder proceed. The shrinkage of the green laminated body and the decreased adhesion may also cause structural defects such as delamination at the interfaces between the internal electrodes and the ceramic layers.

These structural defects occur more markedly with a decreasing thickness of the ceramic layer and with a decreasing grain size of the ceramic material powder in the ceramic green sheet. If the ceramic layer has a large thickness of, for example, more than 1.5 $\mu$m, a ceramic material powder having a large grain size adapted to the thickness of the ceramic layer can be used. The amount of the binder essential for the ceramic green sheet can therefore be decreased to thereby decrease the amount of the gas formed as a result of decomposition of the binder. In addition, the green laminated body less shrinks during the debinder process step. Accordingly, structural defects caused by these factors, such as delamination at the interfaces between the internal electrodes and the ceramic layers, can be minimized.

Similar problems also occur in multilayer ceramic electronic components other than the multilayer ceramic capacitors.

SUMMARY OF THE INVENTION

Accordingly, it is an object of the present invention to provide a method for manufacturing a multilayer ceramic electronic component which can solve the above problems, as well as a multilayer ceramic electronic component manufactured by this method.

Specifically, the present invention provides, in a first aspect, a method for manufacturing a multilayer ceramic electronic component including the steps of preparing a ceramic green sheet including a ceramic material powder and a binder; preparing a metal film by a thin film forming method; forming a green laminated body by laminating a plurality of the ceramic green sheets and the metal films; removing the binder by subjecting the green laminated body to a heat treatment; and forming a sintered laminated body by firing the heat-treated green laminated body. To solve the above problems, the green laminated body is subjected to the heat treatment in a pressurized atmosphere at a gauge pressure exceeding 0.1 MPa in the step of removing the binder. By this configuration, abrupt evolution of a gas inside the green laminated body as a result of decomposition of the binder can be prevented.

Accordingly, structural defects caused by the decomposed gas, such as delamination at the interfaces between the metal film or the resulting internal electrodes and the ceramic green sheet or the resulting ceramic layers, can be minimized even if the electrode in the form of a film which prevents diffusion of the decomposed gas in the debinder process step is present in the green laminated body.

The gauge pressure in the step of removing the binder is preferably equal to or more than about 0.15 MPa. This configuration further effectively prevents production of the decomposed gas as a result of decomposition of the binder and evaporation of a plasticizer, if any, to enable the resulting multilayer ceramic electronic component to be resistant to such structural defects.

The ceramic material powder in the ceramic green sheet preferably has a grain size in a range from about 50 to 200 nm. This configuration enables the ceramic green sheet to be thinned and the resulting ceramic layers to be thinned to a thickness of, for example, less than or equal to about 1.5 $\mu$m. However, the amount of the binder required for the ceramic green sheet increases with a decreasing grain size of the ceramic material powder. Accordingly, the present invention exhibits specifically marked advantages under these conditions.

A process selected from, for example, vapor deposition, sputtering, electroplating and chemical plating may be used as the thin film formation method to prepare the metal film.

In the method according to the present invention, it is preferred that the metal film is formed on a supporting member, and the metal film on the supporting member is transferred onto the ceramic green sheet to thereby yield the green laminated body.

The ceramic green sheet preferably further includes a plasticizer. Evaporation of the plasticizer can be prevented by the heat treatment in a pressurized atmosphere, and the ceramic green sheet can keep its plasticity even at temperatures at which the gas is produced as a result of decomposition of the binder. The resulting multilayer ceramic electronic component therefore becomes resistant to the structural defects mentioned above.

The present invention is also directed to a multilayer ceramic electronic component obtained by the manufacturing method. The multilayer ceramic electronic component includes ceramic layers formed from the ceramic green sheet, and metal films formed from the conductor.

In the multilayer ceramic electronic component, the ceramic layers each preferably have a thickness of less than or equal to about 1.5 $\mu$m and the metal film each preferably have a thickness of less than or equal to about 0.8 $\mu$m. This configuration is advantageous for increasing the number of layers in the resulting multilayer ceramic electronic component.

By applying the method for manufacturing a multilayer ceramic electronic component according to the present invention, for example, a multilayer ceramic capacitor can be manufactured. In this case, the plurality of the metal films are arranged so as to yield electrostatic capacity in the step of forming the green laminated body, and the method further includes the step of forming external electrodes on an outer surface of the sintered laminated body to thereby yield a multilayer ceramic capacitor.

The present invention is also directed to a multilayer ceramic capacitor obtained by the manufacturing method just mentioned above. The multilayer ceramic capacitor includes ceramic layers formed from the ceramic green sheet, internal electrodes formed from the conductor, and the outer electrodes.

In the multilayer ceramic capacitor, the ceramic layers each preferably have a thickness of less than or equal to about 1.5 $\mu$m and the internal electrodes each preferably have a thickness of less than or equal to about 0.8 $\mu$m. This configuration is advantageous for downsizing and achieving higher capacity of the multilayer ceramic capacitor.

The present invention, therefore, enables the multilayer ceramic electronic component to be thinned and to have an increased number of layers. When the present invention is applied to a multilayer ceramic capacitor, the invention advantageously enables downsizing and higher capacity of the multilayer ceramic capacitor.

DESCRIPTION OF THE PREFERRED EMBODIMENTS

Figure 1:
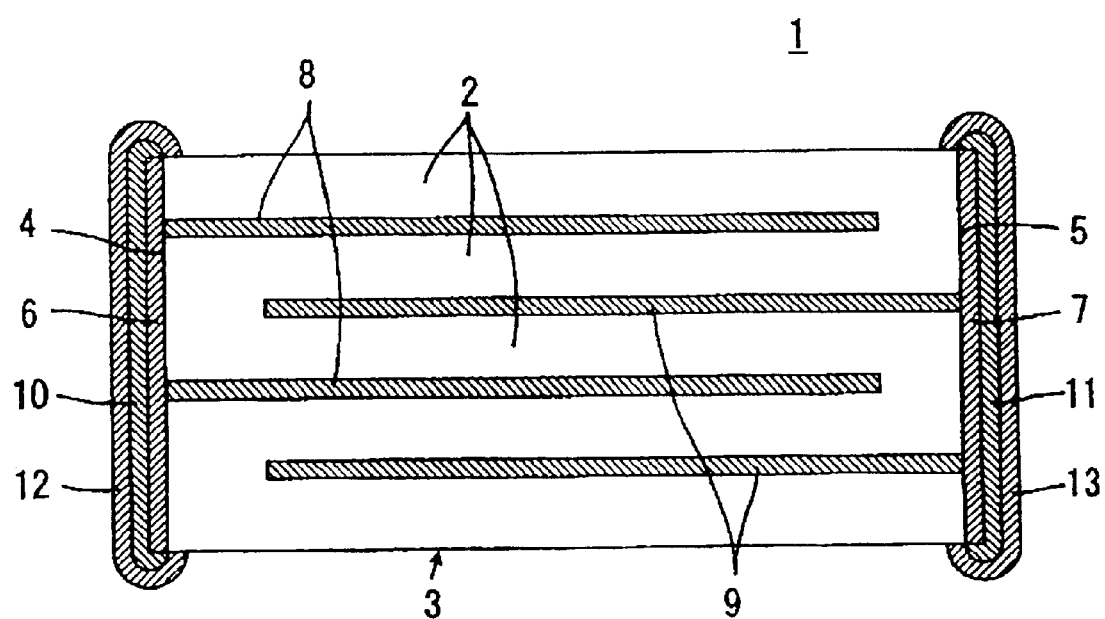
FIG. 1 is a sectional view of a multilayer ceramic capacitor 1 manufactured by a method as an embodiment of the present invention.

FIG. 1 is an embodiment of a multilayer ceramic capacitor 1 to which the present invention is applied.

With reference to FIG. 1, the multilayer ceramic capacitor 1 comprises an laminated body 3 and first and second external electrodes 6 and 7. The laminated body 3 includes ceramic layers 2 composed of laminated plural plies of a dielectric ceramic. The first and second external electrodes 6 and 7 are formed on first and second end faces 4 and 5 of the laminated body 3, respectively.

The laminated body 3 includes fist internal electrodes 8 and second internal electrodes 9 arranged in a staggered configuration. The first internal electrodes 8 are formed along specific interfaces between the ceramic layers 2, respectively, with their edges exposed to the first end face 4 so as be electrically connected with the first outer electrode 6. The second internal electrodes 9 are formed along specific interfaces between the ceramic layers 2, respectively, with their edges exposed to the second end face 5 so as be electrically connected with the second external electrode 7.

Where necessary, the external electrodes 6 and 7 are covered with first plated layers 10 and 11 made of, for example, Ni, Cu, or a Ni—Cu alloy. In addition, second plated layers 12 and 13 made of, for example, solder or tin may be formed on the first plated layers 10 and 11.

In the multilayer ceramic capacitor 1, the ceramic layers 2 in the laminated body 3 comprise, for example, a dielectric ceramic obtained by firing a ceramic material powder mainly containing barium titanate ($BaTiO_3$).

In this case, the A/B ratio of the A-site atom (Ba) to the B-site atom (Ti) in barium titanate is not limited to 1 and can vary in a range of, for example, from about 0.95 to about 1.05. To yield a non-reducing dielectric ceramic, the A/B ratio is preferably in a range of from 1.000 to 1.035.

The ceramic material powder for the dielectric ceramic mainly containing barium titanate may further comprise additives such as rare earth elements, Ca, Zr, Mn, Mg and Si, or sintering aids such as Si, B, Al, Mg, and Li depending on desired characteristics.

The internal electrodes 8 and 9 comprise, for example, metal films mainly containing Pt, a Pd—Ag alloy or Ni and formed by a thin film formation method. Ni is preferably used as the metal constituting the internal electrodes 8 and 9 because of its low cost.

The external electrodes 6 and 7 can be formed by applying a conductive paste comprising, for example, a $B_2O_3$—$Li_2O$—$SiO_2$—BaO glass frit and including Ag as a conductive component onto the end faces 4 and 5 of the laminated body 3 and baking the same in a reducing atmosphere.

Materials for use in the internal electrodes 8 and 9 and the external electrodes 6 and 7 are not limited to those mentioned above. For example, the same material can be used in the external electrodes 6 and 7 and the internal electrodes 8 and 9.

The multilayer ceramic capacitor 1 having the above configuration can be manufactured in the following manner.

Initially, a ceramic slurry comprising a plasticizer and a vehicle (binder and solvent) including the ceramic material powder, is prepared. The ceramic slurry is molded into a sheet by, for example, the doctor blade process to thereby yield a ceramic green sheet.

The ceramic green sheet will constitute the ceramic layers 2 shown in FIG. 1. The ceramic green sheet may be thinned so as to yield ceramic layers 2 having a thickness of less than or equal to about 1.5 $\mu$m after firing, i.e., after sintering.

When the ceramic green sheet is thinned in the above manner, the ceramic material powder in the ceramic green sheet preferably has a grain size of from about 50 to 200 nm.

Additionally, a metal film (foil-like conductor) to be the internal electrodes 8 and 9 shown in FIG. 1 is prepared. The metal film is formed by a thin film formation method such as vapor deposition, sputtering, electroplating or chemical plating.

The vapor deposition, sputtering, electroplating and chemical plating processes can be used in combination. In this case, thin films composed of different metals can be formed by different processes. For example, a thin film of copper is initially formed by vapor deposition, and a thin film of nickel is then formed by electroplating to thereby yield a metal film comprising layers of the copper thin film and the nickel thin film.

In the formation of the metal film by the thin film formation method, the metal film is preferably formed on a supporting member made of, for example, a resin film.

The metal film formed by the thin film formation method can be subjected to, for example, resist treatment to pattern the same to form the internal electrodes 8 and 9. Alternatively, a mask corresponding to the pattern of the internal electrodes 8 and 9 is used during the thin film formation method.

The thickness of the resulting metal film is preferably less than or equal to about 0.8 $\mu$m. If the thickness exceeds about 0.8 $\mu$m, the resulting multilayer ceramic capacitor 1 shown in FIG. 1 may exhibit a larger distortion due to the laminated internal electrodes 8 and 9 and ceramic layers 2. In contrast, if it is excessively small of, for example, less than or equal to about 0.1 $\mu$m, the electric resistance of the resulting internal electrodes 8 and 9 may increase, and the required characteristics and reliability of the multilayer ceramic capacitor may be deteriorated in some cases.

Next, a green laminated body to be the laminated body 3 shown in FIG. 1 is prepared. Specifically, plural plies of the ceramic green sheet and plural plies of the metal film are laminated to thereby yield a green laminated body comprising plural layers of the metal film laminated with the interposition of the ceramic green sheets. In this procedure, the metal film is arranged so as to yield electrostatic capacity.

The step of preparing the green laminated body preferably includes the step of transferring the metal film formed on a supporting member onto the ceramic green sheet. For further smooth transfer, thermal transfer is preferably employed herein.

Thus, a ceramic green sheet carrying the metal film on one principle plane is obtained. To obtain such a ceramic green sheet carrying the metal film on one principle plane, it is also acceptable that the ceramic green sheet is formed on a supporting member on which the metal film is formed.

The green laminated body is preferably pressed in a lamination direction and is cut according to necessity.

Next, the green laminated body is subjected to a process step of removing the binder, i.e., to a debinder process step.

In the debinder process step, the green laminated body is subjected to heat treatment in a pressurized atmosphere at a gauge pressure exceeding 0.1 MPa. The pressurization of the atmosphere in the debinder process step prevents abrupt evolution of a gas as a result of decomposition of the binder in the green laminated body. In addition, the pressurization also prevents evaporation of the plasticizer added with the binder in the ceramic green sheet to thereby enable the ceramic green sheet to keep its plasticity even at temperatures at which the gas is produced as a result of decomposition of the binder. These configurations also enable the multilayer ceramic capacitor to be resistant to structural defects as mentioned above.

The gauge pressure in the debinder process step is preferably equal to or more than about 0.15 MPa. If the gauge pressure is less than about 0.15 MPa, the decomposed gas evolution and the plasticizer evaporation may not sufficiently be prevented, and the gas produced as a result of decomposition of the resin components (the binder and plasticizer) in the ceramic green sheet may cause structural defects in the resulting laminated body 3 in some cases.

When a base metal such as Ni is used in the metal film to constitute the internal electrodes 8 and 9 described above, the resulting internal electrodes 8 and 9 are oxidized unless the atmosphere in the debinder process step is a non-oxidizing atmosphere. Accordingly, the debinder process step is generally performed in an atmosphere of a neutral gas such as nitrogen gas.

However, decomposition of the binder in the debinder process step in such a non-oxidizing atmosphere proceeds at a lower speed due to low oxygen partial pressure (low oxidizing gas pressure), and the green laminated body must be treated at higher temperatures than processes performed in an oxidizing atmosphere.

If the debinder process step is performed at relatively high temperatures and ambient pressure, however, the plasticizer tends to evaporate during temperature elevation. As a result, the ceramic green sheet may lose its plasticity and thereby invite structural defects due to shrinkage of the laminated body occurring with the debinder process.

In contrast, when the green laminated body is subjected to heat treatment in a pressurized atmosphere as in the present embodiment, evaporation of the plasticizer from the ceramic green sheet is prevented to thereby allow the plasticizer to remain in the ceramic green sheet even during temperature elevation in the debinder process step. Consequently, the resulting ceramic green sheet still remains plastic and can be deformed plastically.

The upper limit of the pressure of the atmosphere in the debinder process step is not specifically limited. However, there is no need of application of such high pressures as in hot isostatic pressing (HIP). In addition, such a high-pressure firing furnace as in HIP exhibits markedly low productivity in mass production and is not preferred from the viewpoint of cost efficiency.

The green laminated body from which the binder has been removed is then fired. When the metal film is made of a base metal such as Ni, the green laminated body is fired in a reducing atmosphere.

The sintered laminated body 3 shown in FIG. 1 is obtained in this manner. The first and second external electrodes 6 and 7 are then formed on the first and second end faces 4 and 5 of the sintered laminated body 3, respectively. Next, the first plated layers 10 and 11 are formed, followed by the formation of the second plated layers 12 and 13 to thereby yield the multilayer ceramic capacitor shown in FIG. 1.

In the above embodiment, a multilayer ceramic capacitor is taken as an example of the multilayer ceramic electronic component. The present invention can also be applied to multilayer ceramic substrates and other multilayer ceramic electronic components each having substantially the same configuration as above.

EXAMPLES

The present invention will be illustrated in further detail with reference to an example below, which is not intended to limit the scope of the invention.

The multilayer ceramic electronic component to be manufactured in this example is a multilayer ceramic capacitor 1 having a configuration as shown in FIG. 1.

Initially, a barium titanate material powder having a composition of $Ba_{1.002}TiO_3$ was prepared by hydrolysis and was then subjected to heat treatment at a temperature of 700° C. to 1000° C. in the air. The powder aggregated as a result of the heat treatment. The aggregated powder was disintegrated and thereby yielded a series of barium titanate material powders having average grain sizes indicated as the grain size of material powder in Table 1.

Additionally, Dy, Mg, Mn and Ba as additives and a sintering aid mainly containing Si—Ba—Li were prepared. These additives were converted into alkoxides compounds that are soluble in organic solvents and were added to each of the barium titanate material powders dispersed in an organic solvent.

The organic solvent was then removed by evaporation, and the barium titanate material powder was further subjected to heat treatment to remove organic components.

To 100 parts by weight of each of the barium titanate material powders containing the aforementioned additives, 15 parts by weight of a poly(vinyl butyral) binder, 5 parts by weight of dioctyl phthalate (DOP) as a plasticizer, and 100 parts by weight of ethanol as an organic solvent were added. The resulting mixture was wet-mixed in a ball mill and thereby yielded a ceramic slurry.

Next, the ceramic slurry was molded into a sheet by the doctor blade process and thereby yielded a series of rectangular ceramic green sheets each having a thickness in a range from 0.7 to 3 µm indicated as the Thickness of Green Sheet in Table 1.

To obtain a metal film to be internal electrodes, a thin film of copper was formed by vapor deposition on a poly (ethylene terephthalate) film which had been subjected to treatment for easy release and a thin film of nickel was then formed on the copper by electroplating. As a result, a metal film 0.6 µm thick was obtained and was then subjected to resist treatment to pattern the same for the formation of the internal electrodes.

The metal film was then thermally transferred to the ceramic green sheet.

Next, plural plies of the ceramic green sheet carrying the metal film were laminated and pressed in such a manner that the sides to which the metal film was exposed were arrayed in a staggered configuration and thereby yielded a green laminated body.

One hundred pieces of the green laminated body were arranged on a zirconia setter, and the zirconia setter was placed in a pressurized firing furnace. The atmosphere (air) inside the furnace was evacuated under a reduced pressure and was replaced with nitrogen gas. Next, the green laminated bodies were heated at a temperature of 400° C. to thereby decompose the binder in the ceramic green sheet, while controlling the pressure in the furnace in a range from atmospheric pressure to a gauge pressure of 0.5 MPa indicated as the Gauge Pressure in Table 1 by adjusting a gas inlet valve and a gas outlet valve.

After the debinder process step, the presence or absence of structural defects in the sample laminated bodies was visually inspected, and the number of non-defect samples free of structural defects was counted. The results are shown as the Efficiency Percentage in Table 1.

TABLE 1

| Sample Number | Grain Size of Material Powder (nm) | Thickness of Green Sheet (µm) | Gauge Pressure 1 (MPa) | Efficiency Percentage (%) |
| --- | --- | --- | --- | --- |
| 1 | 50 | 0.7 | 0.20 | 88 |
| 2 | 88 | 0.7 | 0.20 | 89 |
| 3 | 101 | 1 | 0.20 | 94 |
| 4 | 128 | 1.5 | 0.20 | 95 |
| 5 | 147 | 2 | 0.20 | 99 |
| 6 | 180 | 2 | 0.20 | 100 |
| 7 | 180 | 3 | 0.20 | 100 |
| *8 | 101 | 1 | 0.10 | 3 |
| 9 | 101 | 1 | 0.13 | 23 |
| 10 | 101 | 1 | 0.17 | 85 |
| 11 | 101 | 1 | 0.50 | 100 |
| 12 | 101 | 0.7 | 0.20 | 92 |
| 13 | 101 | 1.5 | 0.20 | 99 |

TABLE 1-continued

| Sample Number | Grain Size of Material Powder (nm) | Thickness of Green Sheet (μm) | Gauge Pressure 1 (MPa) | Efficiency Percentage (%) |
|---|---|---|---|---|
| 14 | 101 | 1.8 | 0.20 | 100 |
| *15 | 230 | 3 | 0.10 | 86 |

Subsequently, each of sample laminated bodies of Sample 3 and 9 through 14 which had been assessed as non-defective was fired at 1050° C. in a reducing atmosphere comprising $H_2$—$N_2$—$H_2O$ gas at an oxygen partial pressure of $10^{-9}$ to $10^{-12}$ MPa for 2 hours.

A conductive paste containing silver as a conductive component and including a $B_2O_3$—$Li_2O$—$SiO_2$—$BaO$ glass frit was then applied to both end faces of the resulting sintered laminated body, and was baked at a temperature of 600° C. in an atmosphere of nitrogen gas to thereby yielded external electrodes electrically connected to the internal electrodes made from the metal film.

The resulting multilayer ceramic capacitor was 5.0 mm wide, 5.7 mm long and 2.4 mm thick in outside dimensions. The thickness of a ceramic layer sandwiched between the internal electrodes is indicated as the Thickness of Ceramic Layer in Table 2. The total number of effective ceramic layers was five, and the counter electrode area per layer was $16.3 \times 10^{-6}$ m$^2$.

The dielectric constant, dielectric breakdown voltage and average life time of each sample of the resulting multilayer ceramic capacitors were determined in the following manner. The results are shown in Table 2.

Specifically, the dielectric capacity (C) was determined according to the method described in Japanese Industrial Standards (JIS) 5102 using an automatic bridge measuring device, and the dielectric constant (ε) was calculated from the measured dielectric capacity.

An increasing direct-current (DC) voltage was applied to the sample at an increasing rate of 100 V/second to determine the dielectric breakdown voltage.

Separately, a direct-current voltage of 5 V was applied to the sample at a temperature of 150° C. as a high-temperature loading test, and the change in insulation resistance of the sample with time was determined. The time when the insulation resistance (R) became 105 or less was defined as failure, and a mean time up to occurrence of failure, i.e., an average life time, was determined.

TABLE 2

| Sample Number | Thickness of ceramic layer (μm) | Dielectric constant | Dielectric breakdown voltage (kV/mm) | Average life Time (hours) |
|---|---|---|---|---|
| 3 | 0.8 | 1210 | 82 | 85 |
| 9 | 0.8 | 1080 | 41 | 11 |
| 10 | 0.8 | 1210 | 86 | 91 |
| 11 | 0.8 | 1240 | 84 | 92 |
| 12 | 0.5 | 1170 | 73 | 73 |
| 13 | 1.2 | 1250 | 89 | 94 |
| 14 | 1.5 | 1300 | 91 | 91 |

Each of the samples will be considered below with reference to Tables 1 and 2.

The samples which carry an asterisk (*) in their sample numbers in Table 1 are samples out of the scope of the present invention. Specifically, the pressure of the atmosphere in the debinder process step in Sample 8 and Sample 15 is 0.10 MPa, lower than the pressure specified in the present invention. Samples 8 and 15 invite relatively large quantity of structural defects and each have a low efficiency percentage.

If comparisons are made between Sample 8 and Sample 15, Sample 8 having a relatively small grain size of material powder and a relatively small thickness of green sheet has a significantly a decreased efficiency percentage. In contrast, Sample 15 having a relatively large grain size of material powder and a relatively large thickness of green sheet does not have a significantly decreased efficiency percentage. This is probably because the decomposed gas relatively smoothly escapes from the peripheries of the plies of the ceramic green sheet during the debinder process step in Sample 15.

If comparisons are made between Sample 9 and Sample 10 in Table 1, these samples have the same grain size of material powder and thickness of green sheet but are manufactured at different gauge pressures. Sample 9 manufactured at a gauge pressure of 0.13 MPa, which is less than about 0.15 MPa, has an efficiency percentage of 23% whereas Sample 15 manufactured at a gauge pressure of 0.17 MPa, which is equal to or more than about 0.15 MPa, has a markedly improved efficiency percentage of 85%. These results demonstrates that the gauge pressure is preferably set at equal to or more than about 0.15 MPa.

Test samples belonging to Sample 9 showed no structural defects in outward appearance but are inferior in dielectric constant, dielectric breakdown voltage and average life time as shown in Table 2. This is probably because the gauge pressure employed in Sample 9 is less than about 0.15 MPa and the resulting laminated body includes some structural defects on their inside.

In contrast, Samples 1 through 7 and 10 through 14 each have a high efficiency percentage after the debinder process step as shown in Table 1 and exhibit satisfactory characteristics in dielectric constant, dielectric breakdown voltage and average life time as shown in Table 2.

In the above example, the amount of the binder in the ceramic green sheet was 15 parts by weight relative to 100 parts by weight of the barium titanate material powder. However, the amount of the binder is not specifically limited to this. The proper amount of the binder varies depending on the grain size of the ceramic material powder and the type (adhesion, the amount of the decomposed gas) of the binder and is appropriately adjusted depending on these parameters.

The binder for use in the present invention is not limited to the aforementioned poly(vinyl butyral) binder. Likewise, the plasticizer is not limited to DOP and includes, for example, dibutyl phthalate (DBP), diethyl phthalate (DEP) and other phthalic esters, and plasticizers of other compositions. The plasticizer used herein is not specifically limited as long as it has compatibility with the binder.

In the above example, the additives in the ceramic slurry for the formation of the ceramic green sheet were converted into alkoxide compounds in order to become soluble in organic solvents. Alternatively, the additives may be converted into acetylacetonato complexes, metallic soaps and other compounds.

While the present invention has been described with reference to what are presently considered to be the preferred embodiments, it is to be understood that the invention is not limited to the disclosed embodiments. On the contrary, the invention is intended to cover various modifications and equivalent arrangements included within the sprit and scope of the appended claims. The scope of the following claims is to be accorded the broadest interpretation so as to encompass all such modifications and equivalent structures and functions.

What is claimed is:

1. A method for manufacturing a multilayer ceramic electronic component comprising:

provifing a ceramic green sheet comprising a ceramic powder and a binder;

providing a thin metal film;

forming a green laminated body by laminating a plurality of the ceramic green sheets and metal films such that the thin metal film is sandwiched between a pair of ceramic green sheets;

removing the binder by subjecting the green laminated body to heat treatment in a pressurized atmosphere at a gauge pressure exceeding 0.1 MPa; and forming a sintered laminated body by firing the heat-treated green laminated body.

2. The method according to claim 1 wherein the gauge pressure during removal of the binder is equal to or more than about 0.15 MPa.

3. The method according to claim 2 wherein the ceramic powder in the ceramic green sheet has a grain size in a range from about 50 to 200 nm.

4. The method according to claim 3 further comprising preparing the metal film by a thin film forming method selected from the group consisting of vapor deposition, sputtering, electroplating, chemical plating and combinations thereof.

5. The method according to claim 4 wherein the preparing the metal film is formed on a supporting member and thereafter transferred from the supporting member to the ceramic green sheet.

6. The method according to claim 5 wherein the ceramic green sheet further comprises a plasticizer.

7. The method according to claim 6 wherein the plurality of meal films are arranged so as to yield electrostatic capacity when forming the green laminated body, and wherein the method further comprises forming a pair of external electrodes on an outer surface of the sintered laminated body each of which is electrically connected with different metal films, to thereby yield a multilayer ceramic capacitor.

8. The method according to claim 7 wherein the green sheets have a thickness of about 1.5 $\mu$m or less, the metal film has a thickness of about 0.8 $\mu$m or less, the binder removal is effected in a non-oxidizing atmosphere, and the firing is effected in a reducing atmosphere.

9. The method according to claim 8 wherein the metal comprises nickel, and the binder removal is effected in a neutral gas atmosphere.

10. The method according to claim 1 wherein the ceramic powder in the ceramic green sheet has a grain size in a range from about 50 to 200 nm.

11. The method according to claim 1 wherein the metal film is formed on a supporting member and thereafter transferred from the supporting member to the ceramic green sheet.

12. The method according to claim 1 wherein the ceramic green sheet further comprises a plasticizer.

13. The method according to claim 1 wherein the green sheets have a thickness of about 1.5 $\mu$m or less, the metal film comprises nickel and has a thickness of about 0.1 to 0.8 $\mu$m, the binder removal is effected in a neutral gas atmosphere, and the firing is effected in a reducing atmosphere.

14. The method according to claim 13 wherein the gauge pressure during removal of the binder is about 0.15 to 0.5 MPa.

15. A multilayer ceramic electronic component manufactured by the method as claimed in claim 1, comprising:

a plurality of ceramic layers formed from the ceramic green sheet; and a plurality of internal electrodes formed from the metal film.

16. The multilayer ceramic electronic component according to claim 15 wherein the ceramic layers each have a thickness of less than or equal to about 1.5 $\mu$m and the internal electrodes each have a thickness of less than or equal to about 0.8 $\mu$m.

17. A multilayer ceramic electronic component manufactured by the method as claimed in claim 15, further comprising a pair of external electrodes each of which is electrically connected to different internal electrodes, to thereby constitute a multilayer ceramic capacitor.

18. The multilayer ceramic electronic component according to claim 17 wherein the ceramic layers each have a thickness of less than or equal to about 1.5 $\mu$m and the internal electrodes each have a thickness of less than or equal to about 0.8 $\mu$m.

* * * * *